(12) United States Patent
Dorfner et al.

(10) Patent No.: US 11,056,955 B2
(45) Date of Patent: Jul. 6, 2021

(54) AIRCRAFT TURBINE WITH COUNTER-ROTATING PROPELLERS

(71) Applicant: Rolls-Royce Deutschland Ltd & Co KG, Blankenfelde-Mallow (DE)

(72) Inventors: Matthias Dorfner, Munich (DE); Korbinian König-Petermaier, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 16/335,840

(22) PCT Filed: Sep. 23, 2016

(86) PCT No.: PCT/EP2016/072683
§ 371 (c)(1),
(2) Date: Mar. 22, 2019

(87) PCT Pub. No.: WO2018/054483
PCT Pub. Date: Mar. 29, 2018

(65) Prior Publication Data
US 2020/0017230 A1 Jan. 16, 2020

(51) Int. Cl.
*H02K 16/02* (2006.01)
*H02K 16/00* (2006.01)
(Continued)

(52) U.S. Cl.
CPC .............. *H02K 16/02* (2013.01); *H02K 16/00* (2013.01); *B64D 35/02* (2013.01); *B64D 35/06* (2013.01)

(58) Field of Classification Search
CPC ...... H02K 16/00; H02K 16/005; H02K 16/02; H02K 21/00; H02K 21/12; H02K 21/14;
(Continued)

(56) References Cited

U.S. PATENT DOCUMENTS 6,217,298 B1 * 4/2001 Klaui ..................... H02K 51/00
310/103
2003/0155876 A1 8/2003 Arimitsu
(Continued)

FOREIGN PATENT DOCUMENTS

CA 2847352 A1 3/2013
CN 101359862 B 8/2011
(Continued)

OTHER PUBLICATIONS

PCT International Search Report and Written Opinion of International Searching Authority dated Jul. 26, 2017 corresponding to PCT International Application No. PCT/EP20161072683 filed Sep. 23, 2016.

*Primary Examiner* — Quyen P Leung
*Assistant Examiner* — Alexander A Singh
(74) *Attorney, Agent, or Firm* — Lempia Summerfield Katz LLC

(57) ABSTRACT

The invention relates to an aircraft turbine having counter-rotating propellers and a primary drive, the noise development of which is significantly reduced with respect to aircraft turbines which have a primary drive based on the internal combustion principle. The invention relates to an aircraft turbine having counter-rotating propellers and a primary drive, the primary drive of which is based on the electric drive principle.

6 Claims, 4 Drawing Sheets

(51) Int. Cl.
*B64D 35/02* (2006.01)
*B64D 35/06* (2006.01)

(58) Field of Classification Search
CPC ........ B64D 35/00; B64D 35/02; B64D 35/04;
B64D 35/06; B64D 27/24; B64C 11/48;
F02K 5/00
USPC ........................ 310/114, 154.33, 156.37, 115
See application file for complete search history.

(56) References Cited

U.S. PATENT DOCUMENTS

| | | | |
|---|---|---|---|
| 2009/0058210 A1* | 3/2009 | Qin ........................ | H02K 23/38 |
| | | | 310/179 |
| 2013/0174533 A1* | 7/2013 | Ribarov .................. | B64C 11/48 |
| | | | 60/226.1 |
| 2013/0181562 A1* | 7/2013 | Gieras .................... | H02K 16/02 |
| | | | 310/114 |
| 2017/0179800 A1* | 6/2017 | Coldwate ............... | H02K 16/02 |

FOREIGN PATENT DOCUMENTS

| | | | |
|---|---|---|---|
| DE | 60320056 | T2 | 7/2008 |
| DE | 202008015201 | U1 | 2/2019 |
| GB | 2465284 | A | 5/2010 |

* cited by examiner

AIRCRAFT TURBINE WITH COUNTER-ROTATING PROPELLERS

CROSS REFERENCE TO RELATED APPLICATIONS

This present patent document is a § 371 nationalization of PCT Application Serial Number PCT/EP2016/072683, filed Sep. 23, 2016, designating the United States, which is hereby incorporated in its entirety by reference.

FIELD

Embodiments relate to aircraft turbines with counter-rotating propellers.

BACKGROUND

Aircraft turbines with counter-rotating propellers are known, the primary drive of which is based on the internal combustion principle.

In a simple propeller arrangement, a swirl is imparted to the air that flows through the propeller, that reduces the efficiency of the propeller. A second counter-rotating propeller attached behind the first propeller reduces this swirl and consequently increases the efficiency of the propeller. However, significant noise generation is entailed by the principle of counter-rotating propellers.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an aircraft turbine with counter-rotating propellers that includes reduced noise generation.

The aircraft turbine with counter-rotating propellers includes a primary drive that is based on the electric drive principle instead of the internal combustion principle.

Electric drives are significantly quieter than internal combustion drives, with the result that the noise generation of the aircraft turbine as a whole is significantly reduced.

The primary drive is configured as a rotationally symmetrical synchronous motor with a tooth coil winding, with a first rotor with a first number of poles for the first propeller, and a second rotor with a second number of poles for the second propeller. The first rotor is an internal rotor and the second rotor is an external rotor. The first number of poles and the second number of poles differ from each other. The first and the second rotor are each mounted so that the rotors can rotate independently with respect to each other. The first and the second rotor each include a shaft-and-flange arrangement for attachment of each of the two propellers.

A primary drive of this type includes a low-volume and hence quiet noise generation and is therefore suited for the drive.

Up until now, in a tooth coil motor only one dominant harmonic of the electric loading has been used. Tooth coil windings, for example, double-layer tooth coil windings, in contrast form an electric loading with multiple dominant harmonics. By choosing different suitably selected numbers of poles, two dominant harmonics are used for each of the rotors mounted so that the rotors can rotate independently of each other.

In an embodiment, the synchronous motor is configured so that it is permanently excited.

In an embodiment, the aircraft turbine is configured such that the counter-rotating propellers rotate at different speeds as a function of the drive frequency.

DETAILED DESCRIPTION

Figure 1:
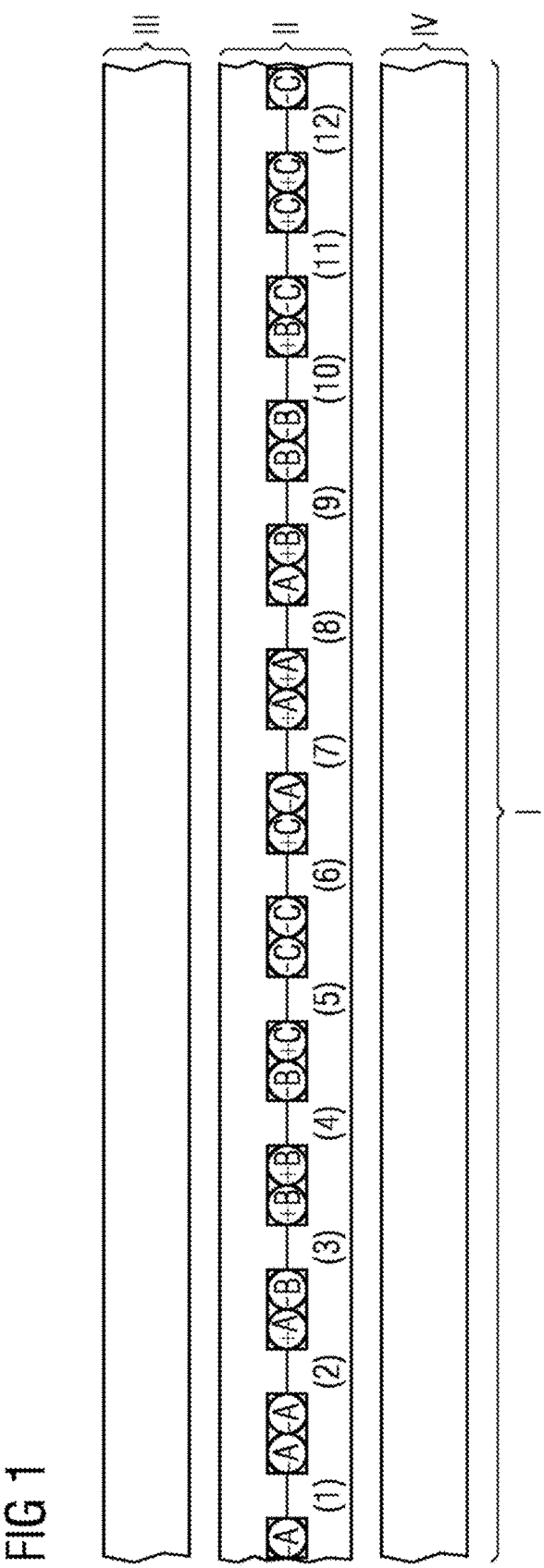
FIG. 1 depicts a motor module in a developed view according to an embodiment.

FIG. 1 depicts a motor module 1, including of a belt winding in the stator II and 10 or 14 poles (tooth coils) in each rotor component III or IV. The portion of the stator II depicted has 12 tooth coils that are arranged on a magnetically and electrically non-conductive support. The rotor component III is configured as an external rotor with, for example, 2P=10 poles (tooth coils) and the rotor component IV is configured as an internal rotor with, for example, 2P=14 poles (tooth coils).

The motor module I refers to the magnetically smallest unit of an electric motor. The motor module I includes a belt winding and rotor arrangements that include numbers of poles that correspond to the belt winding. An electric motor includes at least one motor module I. The electric motor may, however, also have as many motor modules I as are desired that are electromagnetically symmetrical with respect to one another.

The proposed permanently excited synchronous motor includes a rotationally symmetrical structure and for example, the permanently excited synchronous motor is configured with a radial field or an axial field topology. However, to make the view simpler, a developed view is depicted to represent any motor topology.

The motor module I in FIG. 1 includes 12 tooth coils that are arranged on an electrically and magnetically non-conductive support structure. The support structure includes teeth and slots. A tooth coil is arranged on each of the teeth. Two coil sides lie in each slot. In this respect, it is a double-layer tooth coil winding.

Two rotors III and IV are further depicted schematically in FIG. 1. One rotor, for example III, is an external rotor. The second rotor, for example IV, is an internal rotor. The number of poles of the two rotors differ.

Figure 3:
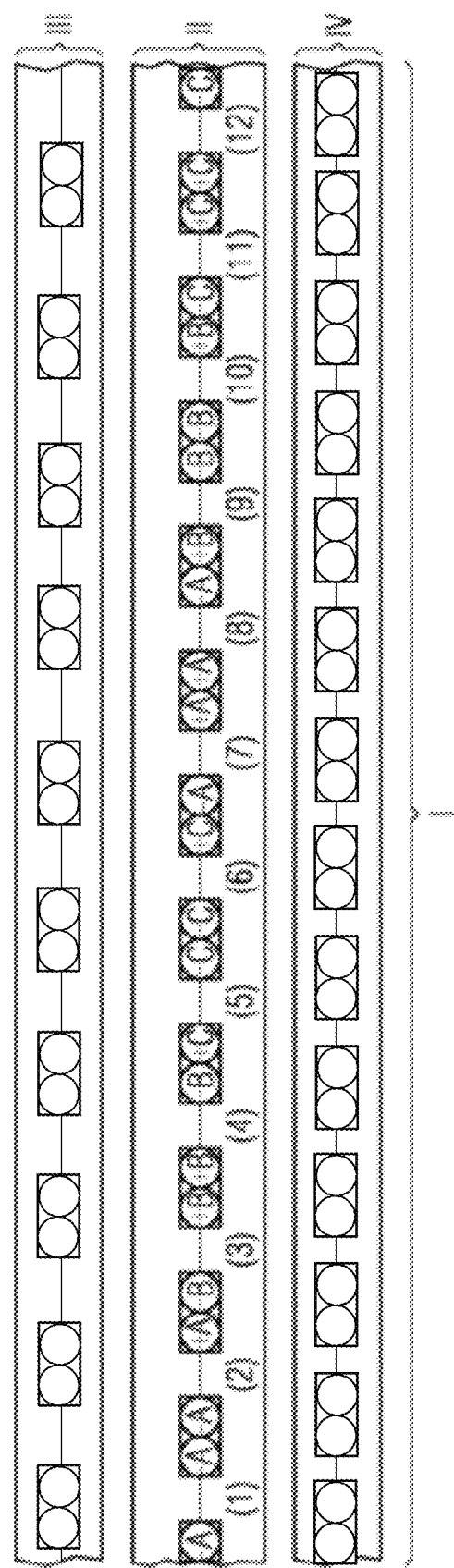
FIG. 3 depicts a motor module in a developed view according to another embodiment.

In FIGS. 1 and 3, the internal rotor IV includes 14 poles in a motor module and the external rotor III includes 10 poles.

If the motor includes N motor modules I, the external rotor includes Nx10 poles and the internal rotor includes Nx14 poles.

Figure 2:
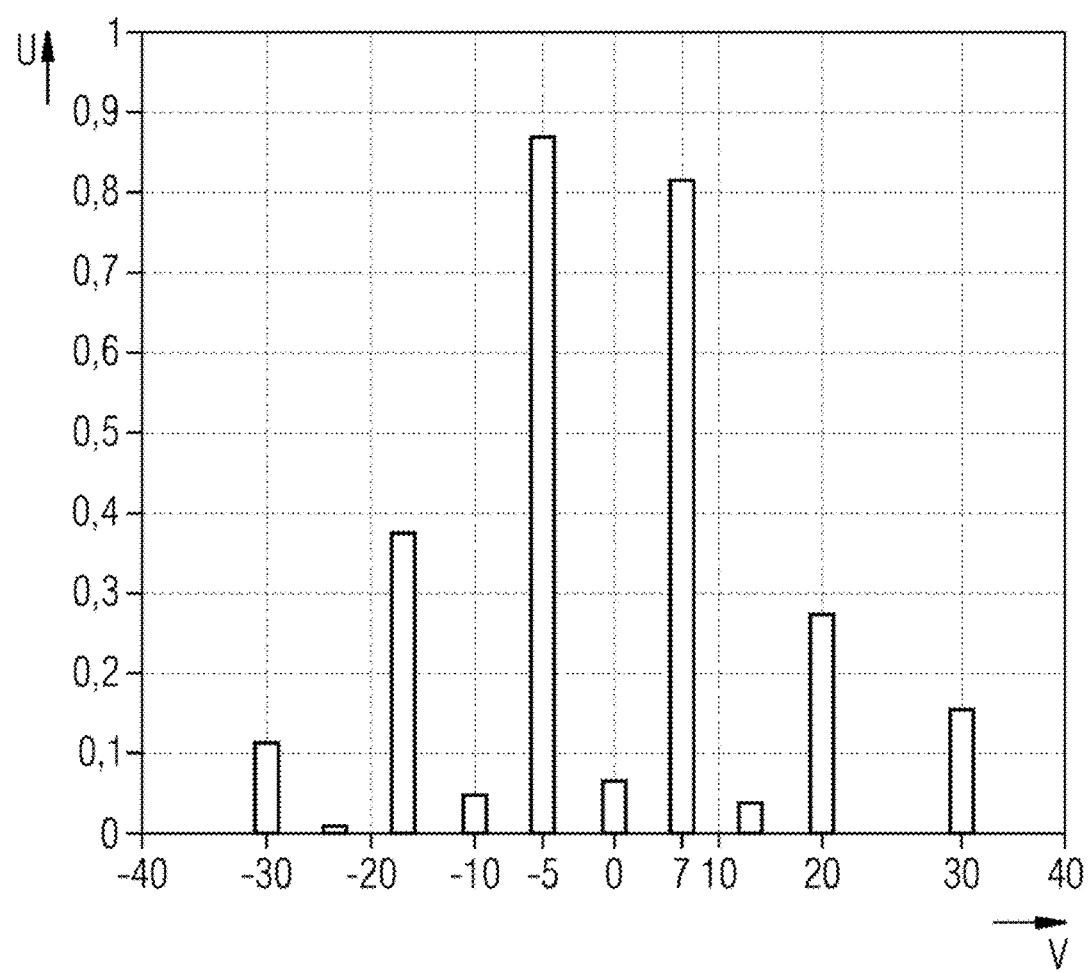
FIG. 2 depicts a diagram with winding factors of a double-layer tooth coil winding according to an embodiment.

The winding factors u are depicted for such winding systems in FIG. 2. The dominant harmonics of the electric loading may be derived from the winding factors u. The winding factors may be considered as a measure of the torque-forming electric loading. The aim is to select one of the dominant electric loading harmonics v. In the present case, assuming v=−5, this equates to the minus fifth electric loading harmonic, or assuming v=7, this equates to the seventh electric loading harmonic. The sign refers to the direction of rotation of the harmonic. The frequency of the two harmonics also differs.

The external rotor with Nx10 or 10 poles rotates synchronously with the fifth harmonic.

The internal rotor with Nx14 or 14 poles rotates synchronously with the seventh harmonic and hence in the opposite direction to the external rotor.

Figure 4:
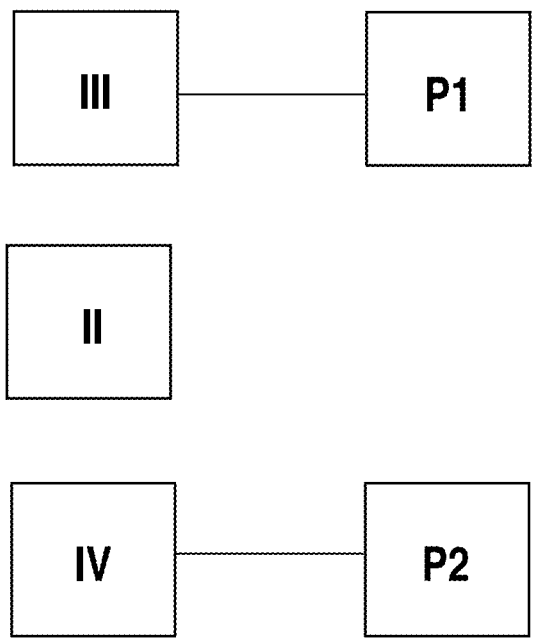
FIG. 4 depicts propellers connected to rotors of a motor module, respectively.

If internal and external rotors III and IV are mounted so that the internal and external rotors III and IV rotate independently of each other and are provided with suitable shaft and flange arrangements, two propellers P1 and P2 may be mounted that, owing to the harmonics used, rotate at different speeds in opposite directions and as a function of their frequency (see FIG. 4).

The propellers may differ in diameter, the shape of the blades, and the number of blades.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An aircraft turbine comprising:
   counter-rotating propellers;
   and a primary drive;
   wherein the primary drive uses an electric drive principle,
   wherein the primary drive is configured as a rotationally symmetrical synchronous motor comprising a stator, a first rotor, and a second rotor,
   wherein the stator includes a first double layer tooth coil winding having a first number of poles,
   wherein the first rotor includes a second double layer tooth coil winding having a second number of poles for a first propeller of the counter-rotating propellers,
   wherein the second rotor includes a third double layer tooth coil winding having a third number of poles for a second propeller of the counter-rotating propellers, and
   wherein the second number of poles of the second double layer tooth coil winding is different than the third number of poles of the third double layer tooth coil winding, such that the primary drive is configured to form an electric loading with multiple dominant harmonics.

2. The aircraft turbine of claim 1, wherein the first rotor is an internal rotor and the second rotor is an external rotor; and
   wherein the first rotor and the second rotor are each mounted so that the first rotor and the second rotor rotate independently with respect to each other.

3. The aircraft turbine of claim 2, wherein the rotationally symmetrical synchronous motor is configured to be permanently excited.

4. The aircraft turbine of claim 2, wherein the counter-rotating propellers rotate at different speeds as a function of a drive frequency.

5. The aircraft turbine of claim 1, wherein the counter-rotating propellers rotate at different speeds as a function of a drive frequency.

6. The aircraft turbine of claim 1, wherein the first number of poles, the second number of poles, and the third number of poles are all different.

\* \* \* \* \*